United States Patent
Gong et al.

(10) Patent No.: US 10,061,530 B2
(45) Date of Patent: Aug. 28, 2018

(54) METHOD AND APPARATUS FOR CONFIGURING REDUNDANCY DATA CENTER IN CLOUD COMPUTING ARCHITECTURE

(71) Applicant: Huawei Technologies Co., Ltd., Shenzhen (CN)

(72) Inventors: Xiaodong Gong, Shanghai (CN); Miaohua Li, Dongguan (CN); Xiaohui Huang, Shanghai (CN); Zhan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 15/292,580

(22) Filed: Oct. 13, 2016

(65) Prior Publication Data
US 2017/0031623 A1 Feb. 2, 2017

Related U.S. Application Data

(63) Continuation of application No. PCT/CN2014/075323, filed on Apr. 14, 2014.

(51) Int. Cl.
*G06F 15/177* (2006.01)
*G06F 3/06* (2006.01)
(Continued)

(52) U.S. Cl.
CPC ............ *G06F 3/0632* (2013.01); *G06F 3/065* (2013.01); *G06F 3/067* (2013.01); *G06F 3/0619* (2013.01);
(Continued)

(58) Field of Classification Search
USPC ....... 709/217, 218, 219, 220, 221, 222, 223, 709/224
See application file for complete search history.

(56) References Cited

U.S. PATENT DOCUMENTS 5,157,663 A * 10/1992 Major ................. G06F 11/1482
714/10
2011/0246627 A1* 10/2011 Kern ..................... G06F 9/5072
709/220
(Continued)

FOREIGN PATENT DOCUMENTS

| CN | 102025776 A | 4/2011 |
|---|---|---|
| CN | 102629224 A | 8/2012 |
| CN | 102947796 A | 2/2013 |

OTHER PUBLICATIONS

International Search Report for International Application No. PCT/CN2014/075353 dated Jan. 21, 2015, 4 pages.
(Continued)

Primary Examiner — Liangche A Wang
(74) Attorney, Agent, or Firm — Fish & Richardson P.C.

(57) ABSTRACT

The present disclosure relates to a method and an apparatus for configuring a redundancy data center in a cloud computing architecture. The method includes receiving a request for configuring a redundancy data center DC for a specified network service NS; acquiring, from an affinity relationship information bank of application objects according to the request for configuring a redundancy DC, information about an affinity and/or anti-affinity relationship among application objects that support the specified network service, where application objects having an affinity relationship rare deployed in a same DC, and application objects having an anti-affinity relationship are deployed in different DCs; and selecting, from deployed DCs, a redundancy DC for the specified network service according to redundancy resource information of the deployed DCs and the acquired information about an affinity and/or anti-affinity relationship.

16 Claims, 6 Drawing Sheets

(51) Int. Cl.
*H04L 29/08* (2006.01)
*G06F 11/20* (2006.01)

(52) U.S. Cl.
CPC .......... *G06F 11/2033* (2013.01); *H04L 29/08* (2013.01); *G06F 2201/805* (2013.01); *G06F 2201/82* (2013.01)

(56) References Cited

U.S. PATENT DOCUMENTS

| | | | | |
|---|---|---|---|---|
| 2011/0258481 | A1* | 10/2011 | Kern | G06F 11/1484 714/4.1 |
| 2013/0019124 | A1* | 1/2013 | Grimshaw | G06F 11/2015 714/24 |
| 2013/0179289 | A1 | 7/2013 | Calder et al. | |
| 2013/0179574 | A1 | 7/2013 | Calder et al. | |
| 2016/0335111 | A1* | 11/2016 | Bruun | G06F 9/45558 |

OTHER PUBLICATIONS

Office Action issued in Chinese Application No. 201480000654 dated Sep. 2, 2016, 8 pages.

\* cited by examiner

METHOD AND APPARATUS FOR CONFIGURING REDUNDANCY DATA CENTER IN CLOUD COMPUTING ARCHITECTURE

CROSS-REFERENCE TO RELATED APPLICATIONS

This application is a continuation of International Application No. PCT/CN2014/075323, filed on Apr. 14, 2014, the disclosure of which is hereby incorporated by reference in its entirety.

TECHNICAL FIELD

The present disclosure relates to the communications and information technology field, and in particular, to a method and an apparatus for configuring a redundancy data center DC in a cloud computing architecture.

BACKGROUND

A redundancy technology refers to setting up two sets or more sets of systems with a similar function in different locations far away from each other. When a working system encounters a disastrous event such as an earthquake or a fire, or a major fault such as a power failure, the working system is switched over to a redundancy system in a different location, so as to retain a capability of providing an application service.

Cloud computing is a service mode of distributing computing tasks to a large number of distributed computers. This mode has a configurable computing resource sharing pool (including a network, a server, storage, application software, a service, and the like), which may provide available, convenient, and on-demand network access for a user. The cloud computing is a product developed by integrating computing manners, such as distributed computing, parallel computing, and utility computing, with network technologies such as network storage, virtualization, and load balance.

As a cloud computing environment gradually matures and network bandwidth continuously increases, data centers (DC) in various places around the globe is continuously emerging and a trend of regional centralization and massiveness of computing resources emerges. In this environment, infrastructure resources become richer, a user may select a redundancy DC according to a need, deploy a redundant application object, and establish a procedure for data synchronization and a disaster switchover. As shown in FIG. 1, FIG. 1 is a schematic diagram of redundancy deployment based on a DC. A DC is generally used as a unit in a process of deploying application objects; and multiple infrastructures and multiple application objects are deployed for one DC.

A network service (NS) is a function or a service item completed together by multiple application objects. In addition to including each application object, elements that affect each network service further include network resources among application objects, and a resource used by each application object. When a redundancy DC is to be deployed for a specified network service (NS) in a cloud computing architecture (that is, the redundancy DC is to be deployed for an application object set that supports the specified network service), a method generally used in the industry is that a user plans a corresponding redundancy DC for the specified network service according to information such as a redundancy resource provided by a cloud computing system, and instructs the cloud computing system to deploy the specified network service in the planned redundancy DC. The manner of manually planning a redundancy DC features poor flexibility and hinders overall management of a system.

SUMMARY

Embodiments of the present disclosure provide a method and an apparatus for configuring a redundancy data center in a cloud computing architecture, so as to solve a problem that overall management of a system is hindered due to poor flexibility of a manner of manually planning a redundancy DC.

According to a first aspect, an apparatus for configuring a redundancy data center in a cloud computing architecture is provided, where the apparatus includes a receiving module, configured to receive a request for configuring a redundancy data center DC for a specified network service NS, and transmit the received request for configuring a redundancy DC to an acquiring module; the acquiring module, configured to acquire, from an affinity relationship information bank of application objects according to the request for configuring a redundancy DC, information about an affinity and/or anti-affinity relationship among application objects that support the specified network service, and transmit the acquired information about an affinity and/or anti-affinity relationship to a selecting module; where application objects having an affinity relationship can be deployed in a same DC, and application objects having an anti-affinity relationship can be deployed in different DCs; and the selecting module, configured to select, from deployed DCs, a redundancy DC for the specified network service according to redundancy resource information of the deployed DCs and the information that is about an affinity and/or anti-affinity relationship and acquired by the acquiring module.

With reference to the first aspect, in a first possible implementation manner, the acquiring module is specifically configured to search, according to the request for configuring a redundancy DC, stored network service chain information for identity information of the application objects that support the specified network service, where the network service chain information includes identity information of application objects that support each network service; and acquire, from the affinity relationship information bank of application objects according to the found identity information, information about an affinity and/or anti-affinity relationship among application objects that correspond to the identity information.

With reference to the first aspect, or the first possible implementation manner of the first aspect, in a second possible implementation manner, the cloud computing architecture is a Network Functions Virtualization NFV architecture; and the affinity relationship information bank of application objects is located in a virtualized network function manager VNFM, or is located in a network functions virtualization management orchestrator NFVO.

With reference to the second possible implementation manner of the first aspect, in a third possible implementation manner, the redundancy resource information of the deployed DCs is located in a virtualized infrastructure manager VIM.

With reference to the first aspect, or any possible implementation manner of the first to third possible implementation manners of the first aspect, in a fourth possible implementation manner, the method further includes a processing module, configured to: if idle redundancy resources of the deployed DCs cannot support the specified network service, adjust at least one deployed network service or at least one application object in a DC, or search for another network service of which a priority is lower than a priority of the specified network service and cancel redundancy deployment of the another network service; or search for another application object of which a priority is lower than a priority of an application object that supports the specified network service and cancel redundancy deployment of the another application object.

According to a second aspect, an apparatus for configuring a redundancy data center in a cloud computing architecture is provided, including a processor and a memory, where the memory stores an execution instruction; and when the apparatus runs, the processor communicates with the memory, and the processor executes the execution instruction to enable the apparatus to perform the following method: receiving a request for configuring a redundancy data center DC for a specified network service NS; acquiring, from an affinity relationship information bank of application objects according to the request for configuring a redundancy DC, information about an affinity and/or anti-affinity relationship among application objects that support the specified network service, where application objects having an affinity relationship can be deployed in a same DC, and application objects having an anti-affinity relationship can be deployed in different DCs; and selecting, from deployed DCs, a redundancy DC for the specified network service according to redundancy resource information of the deployed DCs and the acquired information about an affinity and/or anti-affinity relationship.

With reference to the second aspect, in a first possible implementation manner, in the method executed by the processor, the acquiring, from an affinity relationship information bank of application objects according to the request for configuring a redundancy DC, information about an affinity and/or anti-affinity relationship among application objects that support the specified network service includes searching, according to the request for configuring a redundancy DC, stored network service chain information for identity information of the application objects that support the specified network service, where the network service chain information includes identity information of application objects that support each network service; and acquiring, from the affinity relationship information bank of application objects according to the found identity information, information about an affinity and/or anti-affinity relationship among application objects that correspond to the identity information.

With reference to the second aspect, or the first possible implementation manner of the second aspect, in a second possible implementation manner, the cloud computing architecture is a Network Functions Virtualization NFV architecture; and the affinity relationship information bank of application objects is located in a virtualized network function manager VNFM, or is located in a network functions virtualization management orchestrator NFVO.

With reference to the second possible implementation manner of the second aspect, in a third possible implementation manner, the redundancy resource information of the deployed DCs is located in a virtualized infrastructure manager VIM.

With reference to the second aspect, or any possible implementation manner of the first to third possible implementation manners of the second aspect, in a fourth possible implementation manner, the method executed by the processor further includes: if idle redundancy resources of the deployed DCs cannot support the specified network service, adjusting at least one deployed network service or at least one application object in a DC, or searching for another network service of which a priority is lower than a priority of the specified network service and canceling redundancy deployment of the another network service; or searching for another application object of which a priority is lower than a priority of an application object that supports the specified network service and canceling redundancy deployment of the another application object.

According to a third aspect, a method for configuring a redundancy data center in a cloud computing architecture is provided, including receiving a request for configuring a redundancy data center DC for a specified network service NS; acquiring, from an affinity relationship information bank of application objects according to the request for configuring a redundancy DC, information about an affinity and/or anti-affinity relationship among application objects that support the specified network service, where application objects having an affinity relationship can be deployed in a same DC, and application objects having an anti-affinity relationship can be deployed in different DCs; and selecting, from deployed DCs, a redundancy DC for the specified network service according to redundancy resource information of the deployed DCs and the acquired information about an affinity and/or anti-affinity relationship.

With reference to the third aspect, in a first possible implementation manner, the acquiring, from an affinity relationship information bank of application objects according to the request for configuring a redundancy DC, information about an affinity and/or anti-affinity relationship among application objects that support the specified network service includes searching, according to the request for configuring a redundancy DC, stored network service chain information for identity information of the application objects that support the specified network service, where the network service chain information includes identity information of application objects that support each network service; and acquiring, from the affinity relationship information bank of application objects according to the found identity information, information about an affinity and/or anti-affinity relationship among application objects that correspond to the identity information.

With reference to the third aspect, or the first possible implementation manner of the third aspect, in a second possible implementation manner, the cloud computing architecture is a Network Functions Virtualization NFV architecture; and the affinity relationship information bank of application objects is located in a virtualized network function manager VNFM, or is located in a network functions virtualization management orchestrator NFVO.

With reference to the second possible implementation manner of the third aspect, in a third possible implementation manner, the redundancy resource information of the deployed DCs is located in a virtualized infrastructure manager VIM.

With reference to the third aspect, any possible implementation manner of the first to third possible implementation manners of the third aspect, in a fourth possible implementation manner, the method further includes if idle redundancy resources of the deployed DCs cannot support the specified network service, adjusting at least one deployed network service or at least one application object in a DC, or searching for another network service of which a priority is lower than a priority of the specified network service and canceling redundancy deployment of the another network service; or searching for another application object of which a priority is lower than a priority of an application object that supports the specified network service and canceling redundancy deployment of the another application object.

By using the foregoing method, according to an affinity and anti-affinity relationship among application objects, a redundancy DC may be automatically selected for a user, which features relatively high flexibility and facilitates overall management of a system.

DESCRIPTION OF EMBODIMENTS

Figure 1:
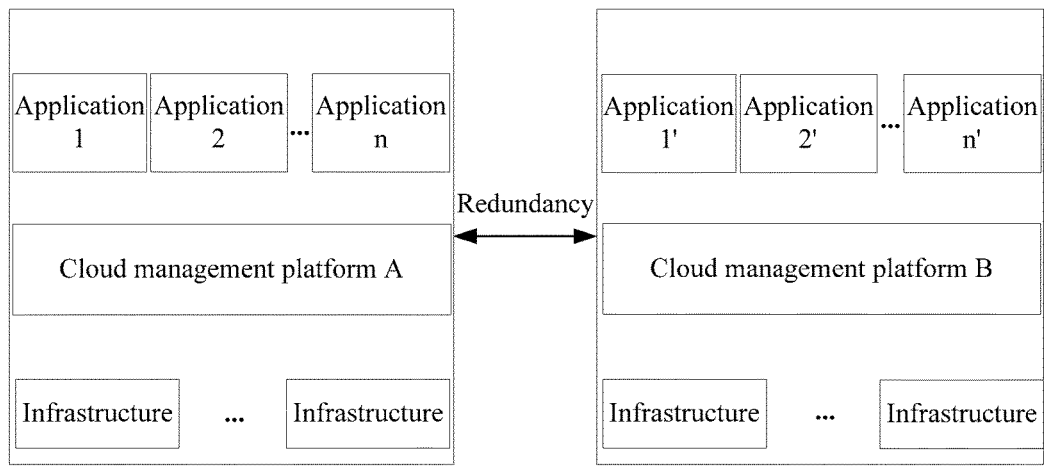
FIG. 1 is a schematic diagram of an example redundancy deployment based on a DC.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The following further describes the embodiments of the present disclosure in detail with reference to the accompanying drawings for the specification.

The embodiments of the present disclosure are applied in configuration of a redundancy DC in a cloud computing architecture. The redundancy DC herein refers to a DC that is used to be deployed with a redundant application object and may be a physical DC or a virtual DC. The application object herein refers to a network element application in a cloud computing architecture, for example, a third-party application and various virtual network elements (such as a base station, a controller, a mobility management entity (MME), a serving gateway (SGW), a packet data network gateway (PGW), or the like). The embodiments of the present disclosure may be applied in a cloud computing architecture based on a conventional information technology (IT), and may also be applied in a network functions virtualization (NFV) cloud computing architecture based on an emerging information and communications technology (ICT).

An affinity relationship information bank (also referred to as an affinity relationship information base, an affinity relationship information library, an affinity relationship information or an affinity relationship information repository) of application objects in the embodiments of the present disclosure is used to collect information about an affinity and/or anti-affinity relationship among application objects. An affinity relationship among application objects herein generally refers to that multiple application objects can be deployed in a same DC, and an anti-affinity relationship refers to that multiple application objects can be deployed in different DCs. That is, multiple application objects having an affinity relationship can be deployed in a same DC, and multiple application objects having an anti-affinity relationship can be deployed in different DCs. By using the embodiments of the present disclosure, according to an affinity and anti-affinity relationship among application objects, a redundancy DC may be automatically selected for a user, which features relatively high flexibility and facilities overall management of a system.

The following embodiments of the present disclosure first introduce implementation of an apparatus for configuring a redundancy DC in a cloud computing architecture, and the implementation of the apparatus is similar to implementation of a subsequently introduced method for configuring a redundancy DC in a cloud computing architecture, and details are not described again for repeated content.

Figure 2:
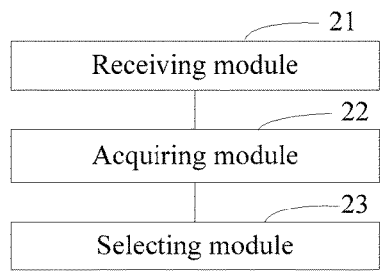
FIG. 2 is a schematic diagram of an apparatus for configuring a redundancy DC in a cloud computing architecture according to Embodiment 1 of the present disclosure.

As shown in FIG. 2, FIG. 2 is a schematic diagram of an apparatus for configuring a redundancy DC in a cloud computing architecture according to Embodiment 1 of the present disclosure, and the apparatus includes:

a receiving module 21, configured to receive a request for configuring a redundancy data center DC for a specified network service NS, and transmit the received request for configuring a redundancy DC to an acquiring module 22;

the acquiring module 22, configured to acquire, from an affinity relationship information bank of application objects according to the request for configuring a redundancy DC, information about an affinity and/or anti-affinity relationship among application objects that support the specified network service, and transmit the acquired information about an affinity and/or anti-affinity relationship to a selecting module 23, where application objects having an affinity relationship can be deployed in a same DC, and application objects having an anti-affinity relationship can be deployed in different DCs; and the selecting module 23, configured to select, from deployed DCs, a redundancy DC for the specified network service according to redundancy resource information of the deployed DCs and the information that is about an affinity and/or anti-affinity relationship and acquired by the acquiring module 22.

Optionally, the acquiring module 22 is specifically configured to:

search, according to the request for configuring a redundancy DC, stored network service chain information for identity information of the application objects that support the specified network service, where the network service chain information includes identity information of application objects that support each network service; and acquire, from the affinity relationship information bank of application objects according to the found identity information, information about an affinity and/or anti-affinity relationship among application objects that correspond to the identity information.

Optionally, the cloud computing architecture is a Network Functions Virtualization NFV architecture; and the affinity relationship information bank of application objects is located in a virtualized network function manager VNFM, or is located in a network functions virtualization management orchestrator NFVO.

Optionally, the redundancy resource information of the deployed DCs is located in a virtualized infrastructure manager VIM.

Optionally, the method further includes a processing module 24, configured to: if idle redundancy resources of the deployed DCs cannot support the specified network service, adjust at least one deployed network service or at least one application object in a DC, or search for another network service of which a priority is lower than a priority of the specified network service and cancel redundancy deployment of the another network service; or search for another application object of which a priority is lower than a priority of an application object that supports the specified network service and cancel redundancy deployment of the another application object.

Figure 3:
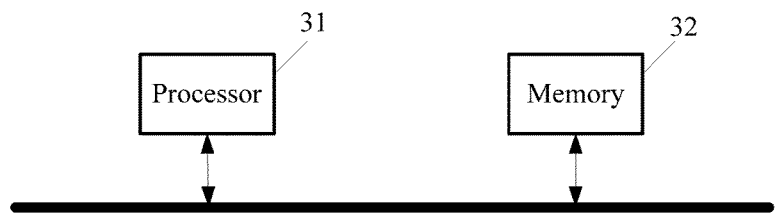
FIG. 3 is a schematic diagram of an apparatus for configuring a redundancy data center in a cloud computing architecture according to Embodiment 2 of the present disclosure.

As shown in FIG. 3, FIG. 3 is a schematic diagram of an apparatus for configuring a redundancy data center in a cloud computing architecture according to Embodiment 2 of the present disclosure, and the apparatus includes a processor 31 and a memory 32, where the memory 32 stores an execution instruction; and when the apparatus runs, the processor 31 communicates with the memory 32, and the processor 31 executes the execution instruction to enable the apparatus to perform the following method:

receiving a request for configuring a redundancy data center DC for a specified network service NS;

acquiring, from an affinity relationship information bank of application objects according to the request for configuring a redundancy DC, information about an affinity and/or anti-affinity relationship among application objects that support the specified network service, where application objects having an affinity relationship can be deployed in a same DC, and application objects having an anti-affinity relationship can be deployed in different DCs; and selecting, from deployed DCs, a redundancy DC for the specified network service according to redundancy resource information of the deployed DCs and the acquired information about an affinity and/or anti-affinity relationship.

Optionally, in the method executed by the processor 31, the acquiring, from an affinity relationship information bank of application objects according to the request for configuring a redundancy DC, information about an affinity and/or anti-affinity relationship among application objects that support the specified network service includes:

searching, according to the request for configuring a redundancy DC, stored network service chain information for identity information of the application objects that support the specified network service, where the network service chain information includes identity information of application objects that support each network service; and acquiring, from the affinity relationship information bank of application objects according to the found identity information, information about an affinity and/or anti-affinity relationship among application objects that correspond to the identity information.

Optionally, the cloud computing architecture is a Network Functions Virtualization NFV architecture; and the affinity relationship information bank of application objects is located in a virtualized network function manager VNFM, or is located in a network functions virtualization management orchestrator NFVO.

Optionally, the redundancy resource information of the deployed DCs is located in a virtualized infrastructure manager VIM.

Optionally, the method executed by the processor 31 further includes: if idle redundancy resources of the deployed DCs cannot support the specified network service, adjusting at least one deployed network service or at least one application object in a DC, or searching for another network service of which a priority is lower than a priority of the specified network service and canceling redundancy deployment of the another network service; or searching for another application object of which a priority is lower than a priority of an application object that supports the specified network service and canceling redundancy deployment of the another application object.

Figure 4:
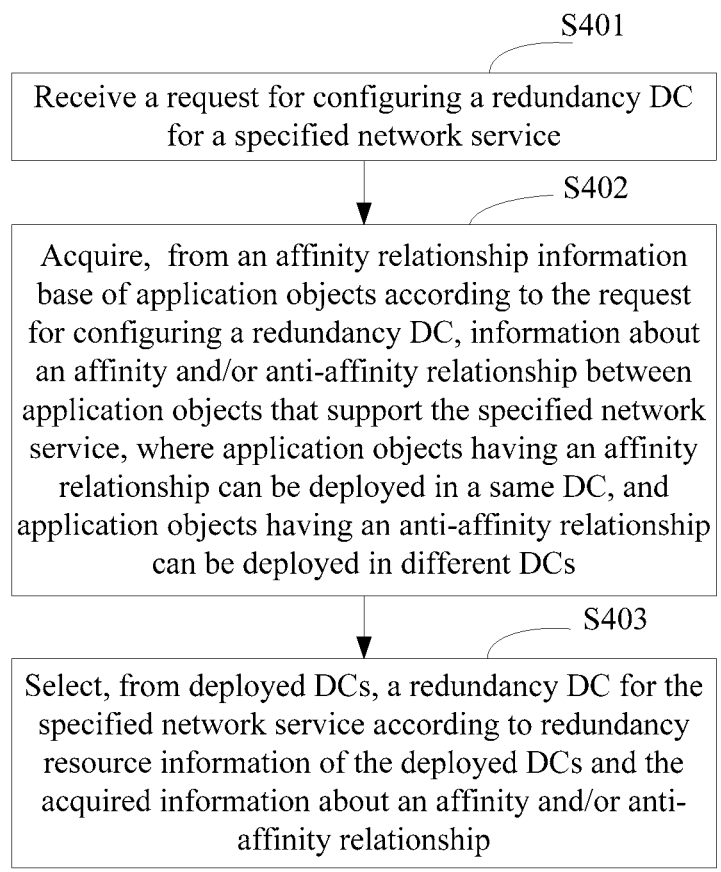
FIG. 4 is a flowchart of a method for configuring a redundancy data center according to Embodiment 3 of the present disclosure.

As shown in FIG. 4, FIG. 4 is a flowchart of a method for configuring a redundancy DC according to Embodiment 3 of the present disclosure, and the method includes the following steps.

At S401, a request for configuring a redundancy DC for a specified network service is received.

In a specific implementation process, an execution body of this embodiment of the present disclosure may be deployed, as a preferring module for a redundancy DC, in an existing functional object of a cloud computing architecture (for example, deployed in a network functions virtualization management orchestrator NFVO in an NFV architecture), and may also be deployed, as an independent functional object, in an existing cloud computing architecture. The request for configuring a redundancy DC may be triggered by a user by using a user interface of the functional object and may also be sent by another functional object (such as an operations support system or a business support system OSS/BSS) in the cloud computing architecture; and it should be noted that the request for configuring a redundancy DC herein may be transmitted as an independent message, and may also be carried in another message (for example, a request message for configuring a redundancy solution) for transmission.

At S402, from an affinity relationship information bank of application objects according to the request for configuring a redundancy DC, information about an affinity and/or anti-affinity relationship among application objects that support the specified network service is acquired. Application objects having an affinity relationship can be deployed in a same DC, and application objects having an anti-affinity relationship can be deployed in different DCs.

Optionally, a process of acquiring the information about an affinity and/or anti-affinity relationship from the affinity relationship information bank of application objects may be: searching, according to the request for configuring a redundancy DC, stored network service chain information for identity information of application objects that support the specified network service, where the network service chain information includes identity information of application objects that support each network service; and acquiring, from the affinity relationship information bank of application objects according to the found identity information, information about an affinity and/or anti-affinity relationship among application objects that correspond to the identity information.

The request for configuring a redundancy DC in step S201 herein may include identity information of the specified network service, for example, a name of the specified network service. Prestored network service chain information may be searched, according to the identity information of the specified network service, for the identity information of the application objects that support the specified network service, and the information about an affinity and/or anti-affinity relationship among the application objects that support the specified network service may be acquired from a pre-established affinity relationship information bank of application objects according to the found identity information of the application objects, that is, it is determined, among the application objects that support the specified network service, which application objects can be deployed in a same DC and which application objects can be deployed in different DCs. Herein, there may be an affinity relationship or may also be an anti-affinity relationship between different application objects, and any application object may have an affinity relationship with some application objects, and may also have an anti-affinity relationship with other application objects.

In a specific implementation process, all or some application objects that have an affinity relationship and can be deployed in a same DC may be deployed together in a same DC, and application objects of all or some application objects that have an anti-affinity relationship and can be deployed in different DCs may be separately deployed in different DCs. For example, among application objects that support a network service NS, there are n application objects having an anti-affinity relationship, and when a redundancy DC is being deployed, the n application objects may be separately deployed in different DCs. However, if there are only n−1 available redundancy DCs, then two application objects of the n application objects can be deployed in a same DC.

At S403, from deployed DCs, a redundancy DC for the specified network service is selected according to redundancy resource information of the deployed DCs and the acquired information about an affinity and/or anti-affinity relationship.

In this step, in addition to the information that is about an affinity and/or anti-affinity relationship and acquired in step S402, the redundancy resource information of the DCs (including information such as a CPU resource and a storage resource) may further be acquired from each infrastructure manager. With reference to the redundancy resource information and the information about an affinity and/or anti-affinity relationship, a redundancy DC is selected for the specified network service. All or some application objects that have an affinity relationship and support the specified network service may be deployed in a same redundancy DC, and application objects of all or some application objects that have an anti-affinity relationship and support the specified network service may be separately deployed in different redundancy DCs.

Optionally, the foregoing method further includes: if idle redundancy resources of the deployed DCs cannot support the specified network service, adjusting at least one deployed network service or at least one application object in a DC, or searching for another network service of which a priority is lower than a priority of the specified network service and cancel redundancy deployment of the another network service; or searching for another application object of which a priority is lower than a priority of an application object that supports the specified network service and canceling redundancy deployment of the another application object.

In a specific implementation process, a network service or an application object that needs redundancy DC resources less than redundancy DC resources needed by the specified network service may be searched for, the found network service or application object is adjusted to be deployed from a first redundancy DC in which the found network service or application object is currently located to a second redundancy DC (this second redundancy DC can accommodate the found network service), and afterwards, the specified network service is deployed in the first redundancy DC. A network service with a lower priority may also be searched for and a redundancy plan is canceled for the found network service with a low priority, that is, a redundant application object of the found network service with a lower priority may be removed from a redundancy DC in which the redundant application object is located, so as to save a redundancy DC resource to deploy the specified network service. An application object with a lower priority may also be searched for and a redundancy plan is canceled for the found application object, so as to save a redundancy DC source to deploy an application object that supports the specified network service.

As described in the foregoing procedure, the cloud computing architecture in this embodiment of the present disclosure may be an NFV architecture. The following focuses on description of implementation in the cloud computing architecture.

Figure 5:
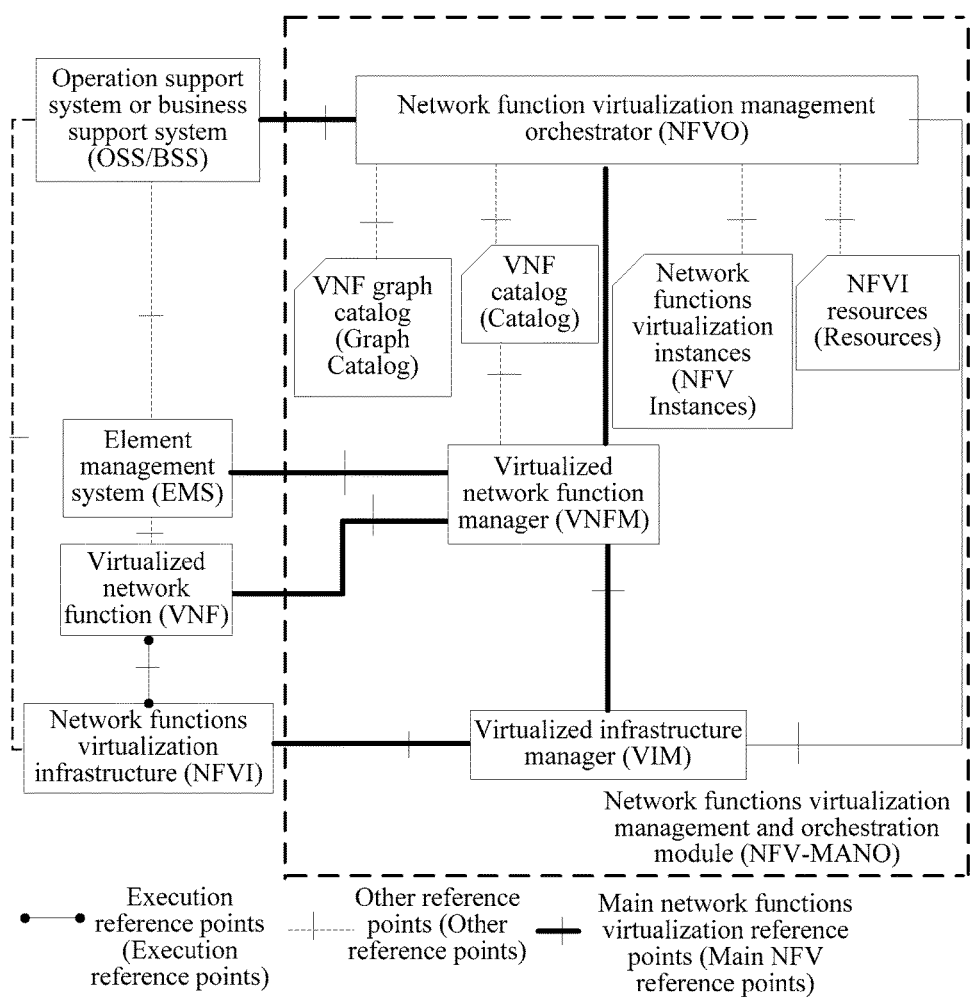
FIG. 5 is a schematic diagram of a management and orchestration (MANO) interface architecture in an NFV architecture.

A management and orchestration module (Management and Orchestration, MANO) that coordinates resources of an entire cloud system is defined in an NFV standard architecture; and as shown in FIG. 5, FIG. 5 is a schematic diagram of an MANO interface architecture in an NFV architecture. In the NFV architecture, functional objects such as a network functions virtualization infrastructure (NFV Infrastructure, NFVI), a virtualized infrastructure manager (VIM), a virtualized network function (VNF), a virtualized network function manager (VNF Manager, VNFM), a network functions virtualization orchestrator (NFVO), an element management system (EMS), and an operation support system or business support system (OSS/BSS) are defined. The NFVI is used to provide a cloudified infrastructure; the VNF is a cloudified network element application (that is, the foregoing application object); the VIM is responsible for management of an infrastructure; the VNFM is responsible for life cycle management of the VNF; the NFVO is responsible for life cycle management of a service; the EMS is a network management system of a network element application; and the OSS/BSS is a network management system of a cloudified system.

In an NFV environment, application objects that support the specified network service form a service chain, and a service chain of each network service includes one or more VNFs. These VNFs work cooperatively and provide a complete network service together. Some of VNFs in a same service chain may need to be deployed in different DCs in various places, so that a distance between each VNF and another VNF that are deployed in different DCs in various places is relatively short, thereby improving user experience of the network service and saving a bandwidth resource of a backbone network. Herein, VNFs that are deployed in different DCs in various places have an anti-affinity relationship between with each other, for example, controllers are deployed in different DCs in various places and each controller controls and manages an adjacent base station, so that a network transmission resource may be saved; for another example, several VNFs (such as mobility management entities MMEs) that support a network service are deployed in different DCs by using a load-sharing redundancy mode, so as to avoid that a fault simultaneously occurs in these VNFs. Some other VNFs may need to be centrally deployed in a same DC in a centralized manner, so that close cooperation is performed by using high-speed network bandwidth in this DC, where these VNFs have an affinity relationship with each other. For example, an MME and an SGW (or a PGW) in a Long Term Evolution (LTE) network are deployed in a same DC, which not only may save a network bandwidth resource but also may improve LTE system performance. Actually, affinity between VNFs is also reflected in another case: Currently, some manufacturers not only provide an infrastructure but also provide a network service. Generally, if a network service, and an infrastructure that supports the network service are provided by a same manufacturer, reliability of the network service is higher or performance is better. Therefore, the network service and the infrastructure provided by the same manufacturer have an affinity relationship with each other. In specific implementation, information about a manufacturer of each application object may also be added into the foregoing affinity relationship information bank of application objects. When a redundancy DC is to be selected, an infrastructure manufactured by a manufacturer that provides the specified network service is selected for the specified network service according to information about a manufacturer of each infrastructure in a redundancy DC. This embodiment of the present disclosure focuses on description of an affinity relationship between VNFs.

In a specific implementation process, information about an affinity and/or anti-affinity relationship between VNFs of the specified network service is acquired from the foregoing pre-established affinity relationship information bank of application objects, and a redundancy DC is configured for the specified network service with reference to the acquired redundancy resource information of the deployed DCs. The following further describes, in a comparative manner, importance of properly configuring a redundancy DC.

Figure 6:
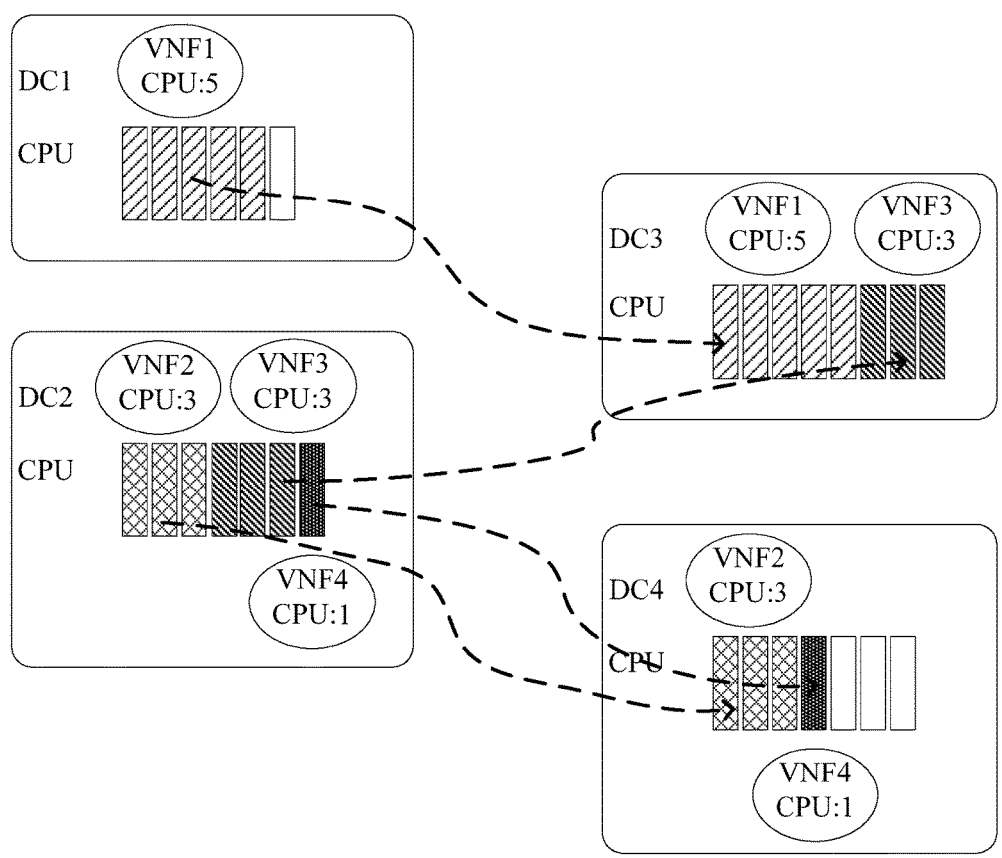
FIG. 6 is a schematic diagram of an improper redundancy DC configuration.
Figure 7:
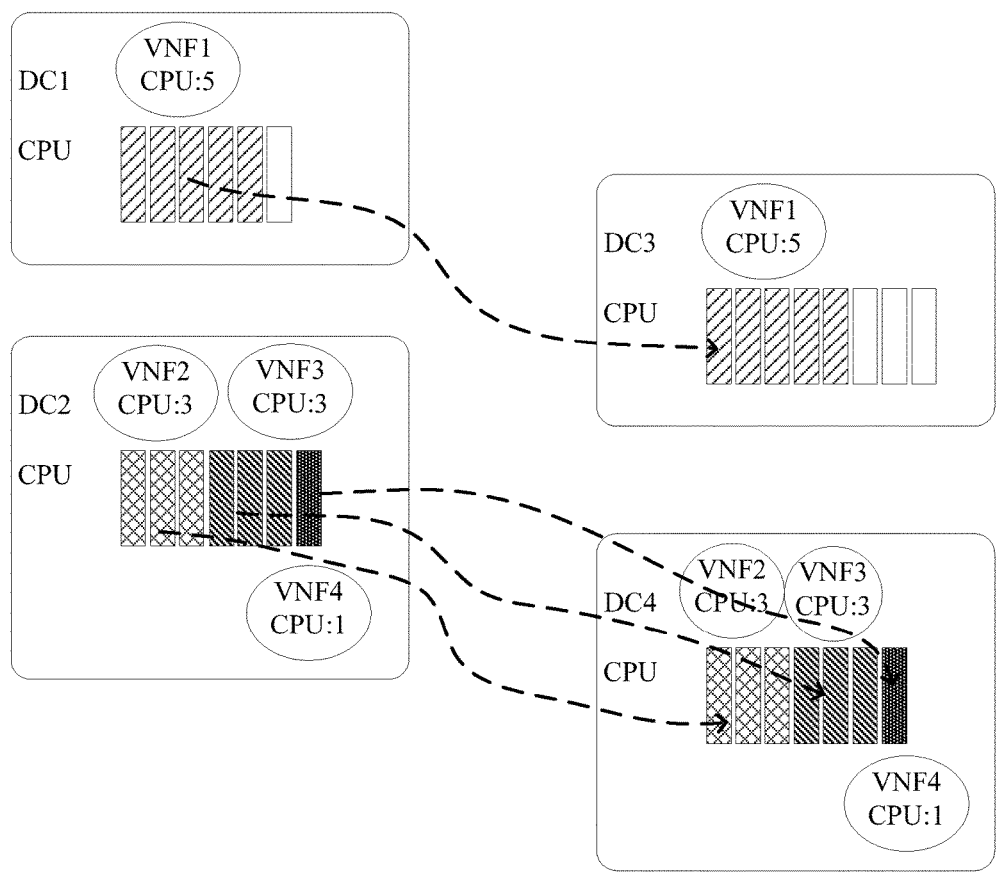
FIG. 7 is a schematic diagram of a proper redundancy DC configuration.

As shown in FIG. 6 and FIG. 7, FIG. 6 and FIG. 7 are a schematic diagram of an improper redundancy DC configuration and a schematic diagram of a proper redundancy DC configuration, respectively. An application object that supports a network service 1 includes VNF1, and application objects that support a network service 2 include VNF2, VNF3, and VNF4. Frequent interaction of data exists among VNF2, VNF3, and VNF4, and therefore higher bandwidth is needed among these three VNFs for being capable of normally providing a service. Bandwidth between DCs is often much less than bandwidth in a DC, and therefore that VNF2, VNF3, and VNF4 are deployed in a same DC can better satisfy a system requirement. In FIG. 6, the VNF3 is deployed in a DC that is different from a DC in which VNF2 and VNF4 are deployed, which is likely to cause, after redundancy, that working efficiency decreases, quality of service (Quality of Service, QoS) and service performance of the network service 2 are affected, and even a service cannot be provided normally. In FIG. 7, VNF3, and VNF2 and VNF4 are deployed in a same DC, thereby ensuring quality of the network service. In FIG. 6 and FIG. 7, a CPU resource is used as a type of redundancy resources in a DC, where CPU: n (n=1, 3 or 5) indicates n CPU resources may be occupied.

As described in the foregoing procedure, an execution body of this embodiment of the present disclosure may be deployed, as a preferring module for a redundancy solution, in an existing functional object of a cloud computing architecture. Specifically, the preferring module for the redundancy solution may be deployed in an NFVO in an NFV architecture, and redundancy resource information of deployed DCs may be stored in a VIM, an NFVO or a VNFM. In a preferable embodiment of the present disclosure, the redundancy resource information of the DCs is stored in the VIM; and there may be the following two manners for deployment of the affinity relationship information bank of application objects:

Optionally, the affinity relationship information bank of application objects is located in a virtualized network function manager VNFM.

Figure 8:
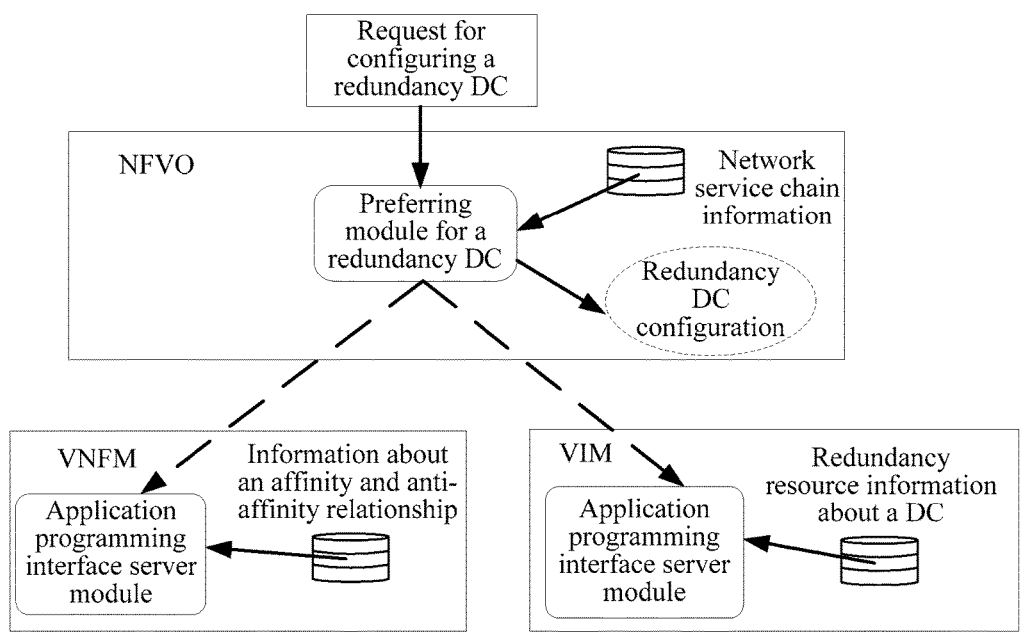
FIG. 8 is a schematic diagram of deployment of components according to an embodiment of the present disclosure.

Specifically, in this implementation manner, the preferring module for the redundancy solution is deployed in an NFVO in an NFV architecture, the affinity relationship information bank of application objects is deployed in a VNFM, and the redundancy resource information of the DCs is stored in a VIM. As shown in FIG. 8, FIG. 8 is a schematic diagram of deployment of components according to an embodiment of the present disclosure. A VIM may provide redundancy resource information of DCs by using an application programming interface server module (API-Server) of the VIM, and a VNFM may provide information about an affinity and/or anti-affinity relationship among application objects by using an application programming interface server module (API-Server) of the VNFM. In this deployment structure, a process of configuring a redundancy DC in this embodiment of the present disclosure may specifically be that: first, an affinity and anti-affinity relationship between VNFs of a specified network service is determined, the determined affinity and anti-affinity relationship is recorded in a service template file, and the recorded service template file is imported into an affinity relationship information bank of application objects of a VNFM; when a redundancy DC of the specified network service needs to be configured (specifically, it may be when a new network service is deployed, or when redundancy deployment needs to be re-planned for the redundancy DC of the specified network service), a preferring module for a redundancy solution in an NFVO determines, according to stored network service chain information, multiple VNFs that support the specified network service; the preferring module for the redundancy solution requests to acquire information about an affinity and/or anti-affinity relationship between the determined multiple VNFs from the VNFM, and requests to acquire redundancy resource information of DCs from the VIM; and a redundancy DC is selected for the specified network service according to the acquired information about an affinity and/or anti-affinity relationship and the redundancy resource information of the DCs, so that all VNFs or some VNFs that have an affinity relationship and support the specified network service are deployed in a same DC, and VNFs of all VNFs or some VNFs that have an anti-affinity relationship and support the specified network service are separately deployed in different DCs.

If an idle resource of the existing redundancy DCs is not sufficient for deploying the specified network service, a deployed network service may be adjusted, or redundancy deployment of a network service with a low priority may be cancelled, so as to save a redundancy DC resource to deploy the specified network service. Specifically, a network service that needs redundancy DC resources less than redundancy DC resources needed by the specified network service may be searched for, and the found network service is moved to another redundancy DC that can accommodate the network service, and afterwards, the specified network service is deployed in a redundancy DC in which the found network service is previously deployed. Another network service of which a priority is lower than a priority of the specified network service may also be searched for, and a redundant VNF of the another network service is removed from a redundancy DC in which the redundant VNF is located, so as to save a redundancy DC resource to deploy the specified network service.

Optionally, the affinity relationship information bank of application objects is located in a network functions virtualization management orchestrator NFVO.

In this deployment structure, specific implementation is similar to the foregoing first manner. However, because the affinity relationship information bank of application objects is directly deployed in the NFVO, after receiving a request for configuring a redundancy DC, the NFVO does not need to request to acquire, from the VNFM, information about an affinity and/or anti-affinity relationship among application objects that support the specified network service, but instead, an affinity relationship information bank that is of application objects and established by the NFVO may be directly searched for the information about an affinity and/or anti-affinity relationship.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

In the foregoing descriptions, the foregoing embodiments are merely intended for describing the technical solutions of the application in detail, but descriptions of the foregoing embodiments are merely for ease of understanding the method and core ideas of the present disclosure, and should not be understood as a limitation to the present disclosure. Any variation or replacement readily figured out by a person skilled in the art within the technical scope disclosed in the present disclosure shall fall within the protection scope of the present disclosure.

What is claimed is:

1. An apparatus for configuring a redundancy data center in a cloud computing architecture, comprising at least one processor and a memory, wherein the memory stores an execution instruction; and when the apparatus operates, the at least one processor communicates with the memory, and the at least one processor executes the execution instruction to enable the apparatus to perform the following method:
   receiving a request for configuring a redundancy data center (DC) for a specified network service (NS);
   acquiring, from an affinity relationship information bank of application objects according to the request for configuring a redundancy DC, information about an affinity and/or anti-affinity relationship among application objects that support the specified network service, wherein application objects having an affinity relationship are deployed in a same DC, and application objects having an anti-affinity relationship are deployed in different DCs, wherein acquiring comprises:
      searching, according to the request for configuring the redundancy DC, stored network service chain information for identity information of the application objects that support the specified network service, wherein the network service chain information comprises identity information of application objects that support each network service; and
      acquiring, from the affinity relationship information bank of application objects according to the found identity information, information about an affinity and/or anti-affinity relationship among application objects that correspond to the identity information; and
   selecting, from deployed DCs, the redundancy DC for the specified network service according to redundancy resource information of the deployed DCs and the acquired information about the affinity and/or anti-affinity relationship.

2. The apparatus according to claim 1, wherein the cloud computing architecture is a network functions virtualization (NFV) architecture; and
   the affinity relationship information bank of the application objects is located in a virtualized network function manager (VNFM).

3. The apparatus according to claim 2, wherein the redundancy resource information of the deployed DCs is located in a virtualized infrastructure manager (VIM).

4. The apparatus according to claim 1, wherein the cloud computing architecture is a network functions virtualization (NFV) architecture; and the affinity relationship information bank of the application objects is located in a network functions virtualization orchestrator (NFVO).

5. The apparatus according to claim 4, wherein the redundancy resource information of the deployed DCs is located in a virtualized infrastructure manager (VIM).

6. The apparatus according to claim 1, wherein the method executed by the at least one processor further comprises, if idle redundancy resources of the deployed DCs cannot support the specified network service:

adjusting at least one deployed network service or at least one application object in a DC.

7. The apparatus according to claim 1, wherein the method executed by the at least one processor further comprises, if idle redundancy resources of the deployed DCs cannot support the specified network service:

searching for another network service of which a priority is lower than a priority of the specified network service and canceling redundancy deployment of the another network service.

8. The apparatus according to claim 1, wherein the method executed by the at least one processor further comprises, if idle redundancy resources of the deployed DCs cannot support the specified network service:

searching for another application object of which a priority is lower than a priority of an application object that supports the specified network service and canceling redundancy deployment of the another application object.

9. A method for configuring a redundancy data center in a cloud computing architecture, wherein the method comprises:

receiving a request for configuring a redundancy data center (DC) for a specified network service (NS);

acquiring, from an affinity relationship information bank of application objects according to the request for configuring a redundancy DC, information about an affinity and/or anti-affinity relationship among application objects that support the specified network service, wherein application objects having an affinity relationship are deployed in a same DC, and application objects having an anti-affinity relationship are deployed in different DCs, wherein acquiring comprises:

searching, according to the request for configuring the redundancy DC, stored network service chain information for identity information of the application objects that support the specified network service, wherein the network service chain information comprises identity information of application objects that support each network service; and acquiring, from the affinity relationship information bank of application objects according to the found identity information, information about an affinity and/or anti-affinity relationship among application objects that correspond to the identity information; and selecting, from deployed DCs, the redundancy DC for the specified network service according to redundancy resource information of the deployed DCs and the acquired information about the affinity and/or anti-affinity relationship.

10. The method according to claim 9, wherein the cloud computing architecture is a network functions virtualization (NFV) architecture; and the affinity relationship information bank of the application objects is located in a virtualized network function manager (VNFM).

11. The method according to claim 10, wherein the redundancy resource information of the deployed DCs is located in a virtualized infrastructure manager (VIM).

12. The method according to claim 9, wherein the cloud computing architecture is a network functions virtualization (NFV) architecture; and the affinity relationship information bank of the application objects is located in a network functions virtualization orchestrator (NFVO).

13. The method according to claim 12, wherein the redundancy resource information of the deployed DCs is located in a virtualized infrastructure manager (VIM).

14. The method according to claim 9, wherein the method further comprises:

if idle redundancy resources of the deployed DCs cannot support the specified network service, adjusting at least one deployed network service or at least one application object in a DC.

15. The method according to claim 9, wherein the method further comprises:

if idle redundancy resources of the deployed DCs cannot support the specified network service, searching for another network service of which a priority is lower than a priority of the specified network service and canceling redundancy deployment of the another network service.

16. The method according to claim 9, wherein the method further comprises:

if idle redundancy resources of the deployed DCs cannot support the specified network service, searching for another application object of which a priority is lower than a priority of an application object that supports the specified network service and canceling redundancy deployment of the another application object.

* * * * *